United States Patent [19]

Albrecht et al.

[11] 4,121,970

[45] Oct. 24, 1978

[54] NUCLEAR REACTOR INSTALLATION INCLUDING A CORE CATCHING APPARATUS

[75] Inventors: Helmut Albrecht; Leopold Barleon, both of Karlsruhe; Stefan Dorner, Pforzheim; Manfred Fischer, Leopoldshafen; Juergen Wilhelm, Hochstetten, all of Germany

[73] Assignee: Kernforschungszentrum Karlsruhe GmbH, Karlsruhe, Germany

[21] Appl. No.: 679,221

[22] Filed: Apr. 22, 1976

Related U.S. Application Data

[63] Continuation-in-part of Ser. No. 533,251, Dec. 16, 1974, abandoned.

[51] Int. Cl.² ............................................. G21C 9/00
[52] U.S. Cl. ..................................................... 176/38
[58] Field of Search ...................... 176/37, 38, 40, 87

[56] References Cited

U.S. PATENT DOCUMENTS

| 3,018,159 | 1/1962 | Silverman | 176/37 |
| 3,607,630 | 9/1971 | West et al. | 176/87 |
| 3,629,064 | 12/1971 | Ziui | 176/38 |
| 3,702,802 | 11/1972 | Jansen, Jr. | 176/87 |

FOREIGN PATENT DOCUMENTS

958,088  5/1964  United Kingdom ................. 176/40

OTHER PUBLICATIONS

Transactions of ANS, vol. 13, No. 1, Jun. 26, 1970, p. 376, by Jensen et al (I).
Nuclear Applications vol. 5, Aug. 1968, pp. 53, 54.
Transactions of ANS, vol. 23, No.2, Nov. 13, 1970, pp. 720, 721 by Fontana.
BNWL-SA-4005, 6/70, pp. 1-15, by Jansen et al (II).

*Primary Examiner*—Harvey E. Behrend

[57] ABSTRACT

A nuclear reactor installation includes a core catching apparatus for containing the components of a nuclear reactor core during a core melt-down accident which comprises a container provided with means for preventing the mixing of the metallic portion of the core melt with water thereby to avoid formation of explosive gases and spreading of radioactive compounds by an explosion following such core-melt-down-accident.

7 Claims, 4 Drawing Figures

NUCLEAR REACTOR INSTALLATION INCLUDING A CORE CATCHING APPARATUS

REFERENCE TO RELATED APPLICATION

This application is a continuation-in-part application of Patent Application Ser. No. 533,251, filed Dec. 16, 1974, now abandoned.

BACKGROUND OF THE INVENTION

1. Field of the Invention

The invention relates to a nuclear reactor installation including core catching apparatus adapted to be disposed below the core of a nuclear reactor for containing the components of a nuclear reactor core during a core melt-down accident.

2. Description of the Prior Art

If in a loss-of-coolant accident during the operation of a nuclear reactor the emergency core cooling system fails, parts of the core may melt as a result of the heat produced during the rapid decay of the fission products formed by fission of the nuclear fuel atoms during operation of the nuclear reactor.

Following a loss-of-coolant accident, a nuclear reactor is rapidly shut down by insertion of all control rods into the reactor core. However, even if the reactor is properly shut down and heat production by nuclear fission has ended the decay of the fission products in the nuclear reactor core may still generate sufficient heat to melt the core if the core emergency cooling system fails to cool the core after reactor shutdown.

How serious such a core melt-down becomes, that is particularly, how long the melt remains liquid thereby forming a threat of destruction for the reactor containment, depends to a great extent on the degree of removal of the fission products from the nuclear fuel. Removal of the fission products from the melt naturally reduces the heat generation in the melt. However, knowledge of the size of any heat sources remaining in the melt is considered to be necessary for the determination of apparatus designed for the protection of the containment such as core catchers. Each core catcher must be designed for accommodation of all the heat that may be generated in a core after reactor shutdown. In accordance with the present state of the art, it is believed that about 65 ± 15% of all radioactive heat sources remain in the melt after core melt-down.

It is possible that, as a result of a core melt-down, the reactor vessel bottom is melted and even the concrete foundation of the containment is destroyed so that fission products are released. This possibility, of course, forms a great threat to the environment.

It is furthermore possible, particularly in water-cooled reactors, that exotherm chemical reactions take place between the coolant and the fuel rod cladding or other structural materials which usually result in the formation of hydrogen which, together with the oxygen in the containment, forms a highly explosive mixture which, when ignited, could easily destroy the reactor containment resulting in a widespread radioactive contamination of the environment. However, such chemical reactions could also occur in gas cooled reactors if, for example, a break occurs in the steam generator resulting in a water break-in into the core melt.

To avoid the formation of a critical mass after a core-melt-down-accident, a core catcher has been proposed (German DOS No. 2,259,071) which for example consists of a number of superimposed pan-type containers with a central body having at its upper end a conical head. Below its conical head, the central body has two superposed grid structures which are provided with vanes and which distribute the melt and retain fuel particles of various sizes. The liquid melt passes through the grid structures and is retained in the pan-type containers disposed below the grid structures.

Such core catching containers have the purpose of containing the melt within the reactor containment. The decay heat is carried away partially through the walls of the container and partially from the surface of the melt in the container.

In order to contain the molten core parts within the reactor containment it is not only necessary to remove heat from the melt but also to prevent the radiation heat emerging from the melt from melting or damaging portions of the reactor structures or the containment. To prevent such damages preventative structures may be provided or the injection of water may be taken into consideration.

However, whether water can be used for cooling the surface of the melt depends on the possibility of chemical reactions between the water and the melt such as reactions causing formation of hydrogen. In a water cooled reactor contact of the molten core with water cannot be prevented. In a gas-cooled reactor, such contact between water and the melt may be caused by water from a break in the steam generator or by water injected for cooling the reactor internals and the melt.

SUMMARY OF THE INVENTION

A nuclear reactor installation including a nuclear core catching apparatus for containing the components of a nuclear reactor core during a core-melt-down accident. The core catching apparatus includes a layer of compounds which are lighter than the molten metal components of the core but heavier than water and which are adapted to overlay any molten metal components in the container so as to prevent any contact between water, such as coolant, and the molten metal thereby to reduce the dangers associated with a core-melt-down accident such as formation of highly explosive hydrogen-air mixtures which could lead to an explosion and result in wide spread contamination of the environment.

DESCRIPTION OF THE PREFERRED EMBODIMENTS

Figure 1:
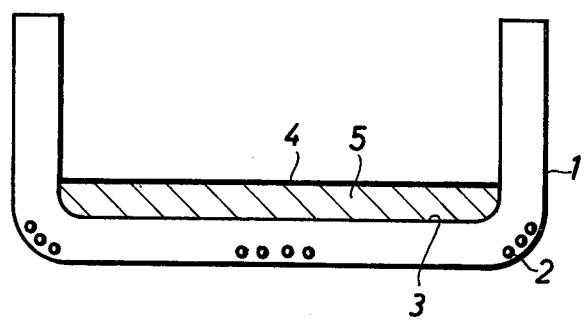
FIGS. 1 and 2 show schematically a nuclear core catching apparatus under normal conditions that is before a core-melt-down accident.
Figure 2:
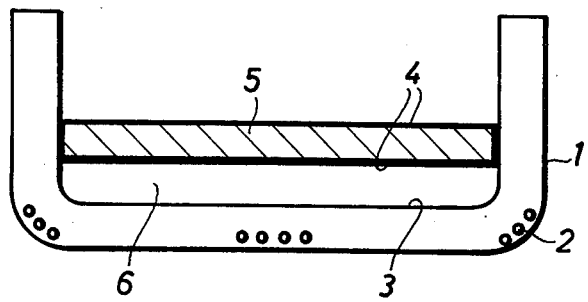

All the figures show a core catching apparatus comprising a pan 1 provided with cooling passages 2 for the reception of a cooling fluid. As shown in FIGS. 1 and 2, the pan 1 contains a protective compound 5 which is inactive with respect to water and has a lower density than the metallic components of the nuclear core in a molten state but a higher density then water. In the arrangement of FIG. 1, the protective compound 5 is directly supported on the bottom wall 3 of the pan 1, whereas in the arrangement of FIG. 2 the protective compound 5 is spaced from the bottom wall 3 of the pan 1. The protective compound 5 may be covered by a metal layer or sheet 4 as shown in FIG. 1 or it may be completely enclosed in metal sheets 4 as shown in FIG. 2 with a space 6 provided between the layer 5 and the bottom wall 3 of the pan 1 into which space 6 the core melt may enter after melting through the sheets 4 and the compound 5. If necessary a support structure (not shown in the drawing) may be provided in the space 6 for supporting the protective compound 5 in spaced relationship from the bottom 3 of the pan 1 such that the space 6 is large enough to be capable of accommodating the core in molten form.

Figure 3:
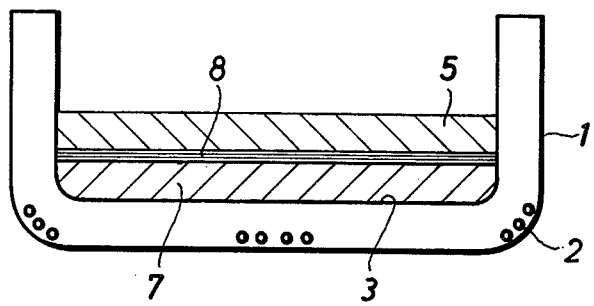
FIGS. 3 and 4 show the same core catching apparatus after a core-melt-down accident that is with the molten part of the core contained therein.
Figure 4:
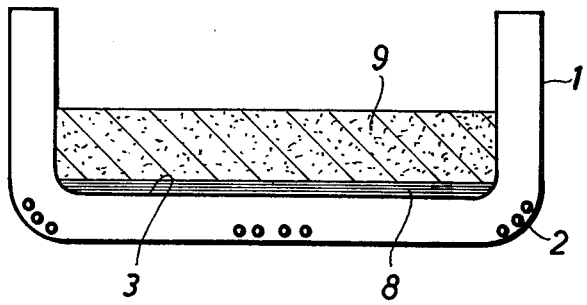

After a core-melt-down accident the core melt 7 consisting essentially of molten nuclear fuel will, as shown in FIG. 3, collect at the bottom of the pan 1 because the core melt 7 has a greater density (ca. 8.7 grams/cm$^3$) than the protective compound 5. A metal melt 8 having the density of molten steel (ca. 7.2 grams/cm$^3$) and resulting from the metal layers 4 and any molten metallic portion of the reactor will be disposed above the core melt 7 and the protective compound 5 will be disposed as a top layer above the metal melt 8. In another embodiment as shown in FIG. 4, wherein the core melt mixes with the protective compound 5 they form together a relatively light mixed layer 9 which has a lower density than the molten metal layer 8 overlays the metal melt 8 and protects the molten metal layer 8 in the container 1 from coming into contact with water or steam.

In a particular experiment $UO_2$ and Zircaloy was heated in a $ZrO_2$ container to 2200° C. and maintained in the container in the molten state for 4 minutes. After solidification a cut showed clearly that two immiscible layers had formed a metallic layer at the bottom and an oxidic layer at the top, the top layer consisting essentially of a mixture of $UO_2$ and $ZrO_2$.

| Ceramic Phase [wt. %] | | Metallic Phase [wt. %] | |
|---|---|---|---|
| Zr | 56.2 | Fe | 70.5 |
| U | 10.8 | Cr | 16.9 |
| Cr | 9.3 | Ni | 10.6 |
| Fe | 3.3 | U | 0.1 |
| Ni | 2.3 | O | 0.06 |
| O | 12.0 | | |

It may be noted at this point that although the nuclear fuel ($UO_2$) may mix with some of the protective compounds under consideration the molten metal does not mix with those compounds nor with the nuclear fuel. The molten metal will therefore always form a layer which is covered either by the protective compounds alone or by a solution consisting of the protective compounds and nuclear fuel, either of which does not react with $H_2O$ and protects the molten metal layer from being contacted by $H_2O$.

In one embodiment of the invention, the protective compound in an oxide or a mixture of several oxides of the group consisting of MgO, CaO, $B_2O_3$ and $SiO_2$.

According to another embodiment of the invention, the protective compound consists of one, or a mixture of several, of the group comprising borates phosphates, chromates and carbonates. The protective compound may also contain an iodine binding material such as silver.

The appendix gives a listing of the borates, phosphates chromates and carbonates that may be used in such a protective layer, together with their melting points. Their density is lower than that of the metal melt so that they form the layer 5 on top of the metal melt 8 as in FIG. 3. Even a mixture of the molten nuclear fuel with the protective compounds is still lighter than the metal melt so that the mixed layer 9 will be disposed on top of the molten layer 8. Preferred, of course, are those borates, phosphates, chromates and/or carbonates which are chemically stable and locally easily available. Generally, these conditions are fulfilled by the alkali and alkaline-earth borates, phosphates, chromates and/or carbonates. Among the carbonates the alkaline-earth carbonates are preferred because of their great chemical stability.

It is noted that some of the compounds listed in the appendix may produce gas ($CO_2$) when coming into contact with the molten metal or when subjected to extremely high temperatures, especially the carbonates. Such generation of gas will increase the gas pressure in the containment. However, the gas pressure generated by this source is relatively small, and under certain conditions, a small increase in gas pressure in the containment has even advantages. In a gas-cooled reactor installation, for example, an increase in pressure in the containment, as it may be caused by thermal decomposition of the carbonates, increases the capability of the gas atmosphere in the containment to cool the melt by an increased mass-flow of the gas in natural convection. In addition, the increased gas pressure impedes the release of fission products. By selection of the amount of carbonates included in the protective layer, the amount of gas that may be released during an accident can be exactly predetermined. Overpressurization can therefore easily be avoided. For example, the pressure in a reactor containment of a volume of 60,000 m$^3$ as it would be provided for a 1000 MWe gas-cooled breeder reactor would be increased only by 1 atm. if 528,669 tons of $BaCO_3$ would be fully decomposed. 528,660 tons of $BaCO_3$ with a density at 20° C. of D = 4.43 g/cm would require a storage volume of 119,338 m$^3$ which, with a core catcher cross-section of ca. 50 m$^2$, would provide a protective layer of 2.38 m thickness. It is noted, however, that a much smaller thickness is normally sufficient especially if also compounds other than carbonates are used. A layer of 0.5 m and the same cross-section of 50 m$^2$ would, in a 60,000 m$^3$ containment, produce an additional gas pressure of less than 0.25 atm.

If silver is added to the protective layer it may may be present in any form such as wires or sheets or even in powder form. It may for example be present in the form of compounds such as $Ag_2O_3$ or $Ag_2CO_3$ which compounds are thermally decomposable and form elemental Ag capable of reacting with any iodine formed by fission in the core melt. The amount of silver should, of course, be large enough to satisfy the purpose of the presence of the silver, that is large enough for the binding of all the iodine expected to be present in the core melt. For example, for a 1000 MWe reactor, the protective layer preferably contains compounds including 30–50 kg of elemental silver. The metal layer 4 and the container 1 consist of materials common in the design of nuclear reactors such as steel and zirconium or nickel alloys or, as to the container 1, common in the design of core catchers such as steel, concrete, fire bricks, etc. Actually, the material of which the container 1 consists is without any bearing as far as the concept of the present invention is concerned. The materials used in reactor design may change with the years. The concept of the present invention, however, will not. The present invention will not become worthless just because the structural materials of nuclear reactors may change sometime in the future.

The thickness required for the container walls depends on the circumstances. If cooling pipes are arranged in the container walls, their thickness must, naturally, be greater than the diameter of the cooling pipes. On the other hand, if the container walls are made of a material such as steel which is intended to be slowly melted for thereby cooling the molten material in the container, their thickness depends to a great extent on the kind of material used for the container. In any case, it poses no problem to the expert to calculate the thickness required for the container walls on the basis of the weight to be supported by the container. Other considerations on which to base such calculations are given for example in U.S. Pat. No. 3,629,064 or in "Nuclear Applications" Vol. 5, August 1968. In a reactor installation for a MWe light water reactor a core catcher may be provided under the reactor core having for example the following specific design features:

| Interior diameter of the container | 7 m |
|---|---|
| Depth of the container | 2 m |
| Volumetric capacity | 76 m³ |

Such a container is capable of receiving

| 100 metric tons of UO₂ | |
|---|---|
| 150 metric tons of steel | |
| 100 metric tons of | protective compound material with an average density of 3.0 g/cm³ such as ⅓ SiO₂; ⅓ CaCO₃ and ⅓ Ba(PO₄)₂. |

The thickness of the protective layer would then be about 1.20 m. With the arrangement according to the invention contact between water or steam and the metal melt in the core catcher is prevented since the protective layer firmly covers the metal melt in the core catcher. Any water that may be present from one of the reactor core cooling circuits or from an emergency cooling system is retained above the protective layer since the protective layer consists of compounds which have a greater density than water. The water also does not react with any of the compounds in the protective layer since these compounds are inactive with regard to water. It may be noted that some reaction of metal with water may take place only while the core is melting and molten metal is flowing down into the core catcher. The amount of hydrogen generated by this relatively short contact however, is not sufficient to provide with the air in the reactor containment an explosive mixture. Once the molten metal is within the core catcher submerged below the protective layer any further generation of $H_2$ gas is prevented so that also the formation of an explosive $H_2$-air mixture in the reactor containment is prevented should a melt-down accident occur. The invention therefore greatly improves the chances for the reactor containment building to remain undamaged and greatly reduces the risk of radioactive contamination of the environment as a result of a reactor core melt-down accident.

Furthermore, the protective layer retains also a large amount of fission products released by the molten nuclear fuel so that even the radioactive contamination of the reactor containment itself is greatly reduced and radioactive fission products trapped in the protective layer can be easily removed upon solidification of the molten core and the protective layer in the core catcher.

The present invention does not only prevent the formation of hydrogen as it might occur by a contact of a metal melt with water or steam but since the fission products remain contained within the protective layer also reduces dissociation of water by radiolysis. Furthermore, the protective compound forms a heat sink capable of receiving some of the heat of the melt so that the temperature of the melt is reduced thereby causing the melt to retain a larger amount of fission products since the volatility of the fission products is greatly reduced at reduced temperatures.

Also, mixing of the nuclear fuel with the protective compound results in a fuel concentration reduced to such a degree that no critical fuel accumulation occurs in the core catching apparatus. This is especially important for fast breeder reactors. The addition of neutron absorbing materials such as $B_2O_3$ to the protective compounds will result in still better protection from the formation of critical amounts of nuclear fuel in the nuclear core catching apparatus.

Table

| Borates | mp(° C) |
|---|---|
| $Li_2O \cdot B_2O_3$ | 760 |
| $Li_2O \cdot 2B_2O_3$ | 925 |
| $Li_2O \cdot 3B_2O_3$ | 750 |
| $Li_2O \cdot 4B_2O_3$ | 730 |
| $Li_2O \cdot 5B_2O_3$ | 680 |
| $Li_2BO_2$ | 845 |
| $NaBO_2$ | 966 |
| $Na_2O \cdot B_2O_3$ | 965 |
| $Na_2O \cdot 2B_2O_3$ | 742 |
| $Na_2O \cdot 4B_2O_3$ | 816 |
| $2NaO \cdot B_2O_3$ | 625 |
| $KBO_2$ | 947 |
| $K_2O \cdot B_2O_3$ | 970 |
| $K_2O \cdot 2B_2O_3$ | 815 |
| $K_2O \cdot 4B_2O_3$ | 857 |
| $MgO \cdot B_2O_3$ | 1191 |
| $2MgO \cdot B_2O_3$ | 1380 |
| $3MgO \cdot B_2O_3$ | 1400 |
| $CaO \cdot B_2O_3$ | 1162 |
| $CaO \cdot 2B_2O_3$ | 987 |
| $2CaO \cdot B_2O_3$ | 1312 |
| $3CaO \cdot B_2O_3$ | 1487 |
| $SrO \cdot B_2O_3$ | 1100 |
| $SrO \cdot 2B_2O_3$ | 940 |
| $2SrO \cdot B_2O_3$ | 1130 |
| $BaO \cdot B_2O_3$ | 1050 |
| $BaO \cdot 2B_2O_3$ | 810 |
| $BaO \cdot 3B_2O_3$ | 740 |
| $BaO \cdot 4B_2O_3$ | 750 |
| $2BaO \cdot B_2O_3$ | 990 |
| $3BaO \cdot B_2O_3$ | 1320 |

| Phosphates | mp(° C) |
|---|---|
| $Li_3PO_4$ | 857 |
| $K_3PO_4$ | 1340 |
| $Mg_3(PO_4)_2$ | 1184 |
| $Sr_3(PO_4)_2$ | 1767 |
| $Ba_3(PO_4)_2$ | 1727 |

| Chromates | mp(° C) |
|---|---|
| $Na_2CrO_4$ | 792 |
| $Na_2Cr_2O_7$ | 356.7 |
| $K_2CrO_4$ | 980 |
| $K_2Cr_2O_7$ | 398 |
| $CaCrO_4$ | 2160 |

| Carbonates | mp(° C) |
|---|---|
| $Li_2CO_3$ | 735 |
| $Na_2CO_3$ | 854 |
| $K_2CO_3$ | 896 |
| $Rb_2CO_3$ | |
| $Cs_2CO_3$ | |
| $MgCO_3$ | |
| $CaCO_3$ | 1340 |
| $SrCO_3$ | 1497 |

Table-continued

BaCO$_3$

What is claimed is:

1. A nuclear reactor installation having an H$_2$O containing coolant associated therewith and comprising: a nuclear core vessel; a nuclear core enclosed within said vessel and including structural metallic components and nuclear fuel; and a core catching apparatus disposed below the nuclear core, said core catching apparatus consisting of a container of highly temperature resistant materials and forming a pan-like melt-through barrier for receiving and containing the components of the nuclear core including the nuclear fuel during a core-melt-down accident; and a protective top layer disposed within the container and supported in spaced relationship above the floor of said container, and adapted to be penetrated by the molten core components flowing from the nuclear core during a core melt-down accident, said top layer being chemically inactive with regard to H$_2$O, and having a lower density than the metallic components of the core, so as to overlay, during such core melt-down accident, the metallic portion of the molten core but having a higher density than water and being present in an amount sufficient to isolate the metallic components of the core melt in the container and protect them from being connected by water thereby preventing the formation of hydrogen.

2. A nuclear reactor installation as recited in claim 1, wherein said protective top layer comprises at least one oxide of the group consisting of MgO, CaO, B$_2$O$_3$ and SiO$_2$.

3. A nuclear reactor illustration as recited in claim 1, wherein said protective top layer comprises at least one component of the group consisting of borates, phosphates, chromates and carbonates.

4. A nuclear reactor installation as recited in claim 1, wherein said protective top layer includes an iodine binding material.

5. A nuclear reactor installation as recited in claim 4, wherein said iodine binding material is silver.

6. A nuclear reactor installation as recited in claim 1, wherein said protective top layer consists of loose material which is covered by a metal sheet adapted to be easily melted during a core melt-down accident for setting free said loose material to overlay the metallic portion of the core melt in the container.

7. A nuclear reactor installation as recited in claim 6, wherein said layer of loose material is sandwiched between two metal sheets.

* * * * *